Feb. 23, 1960

G. H. FRY 2,925,695

BAG HANDLING MACHINES

Filed July 24, 1957

INVENTOR
GEORGE H. FRY
BY
Jerome Bauer
ATTORNEY.

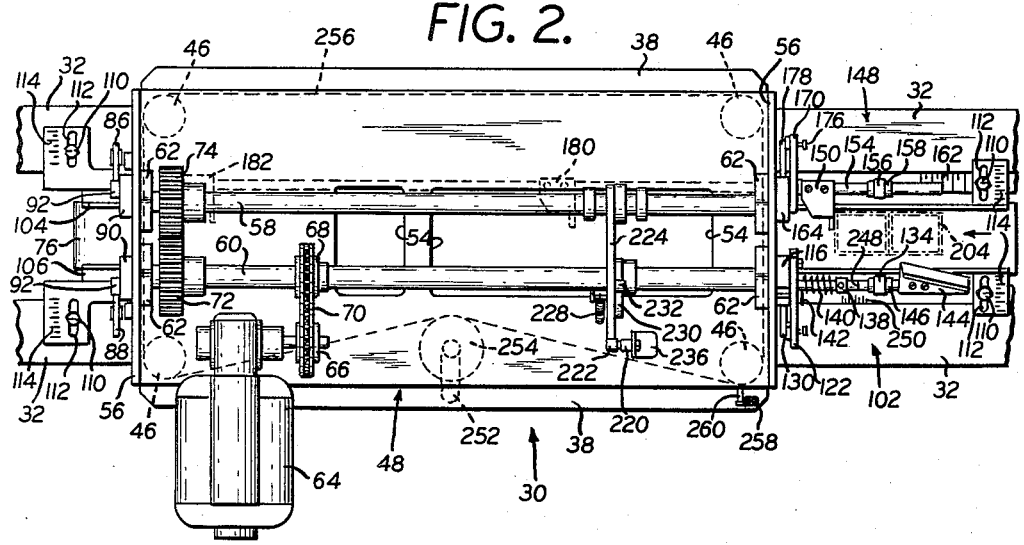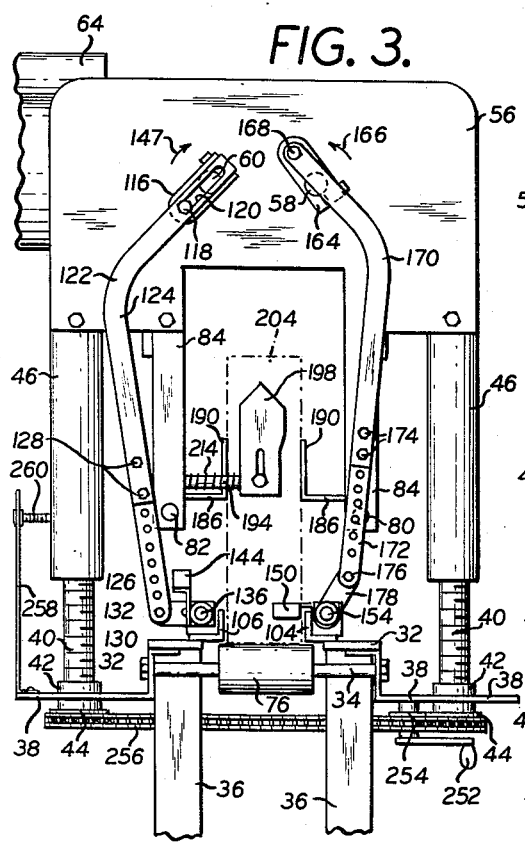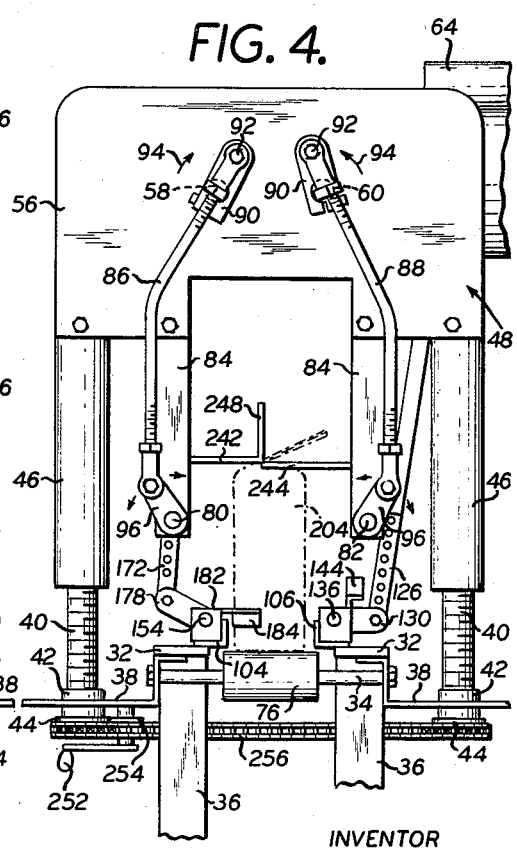

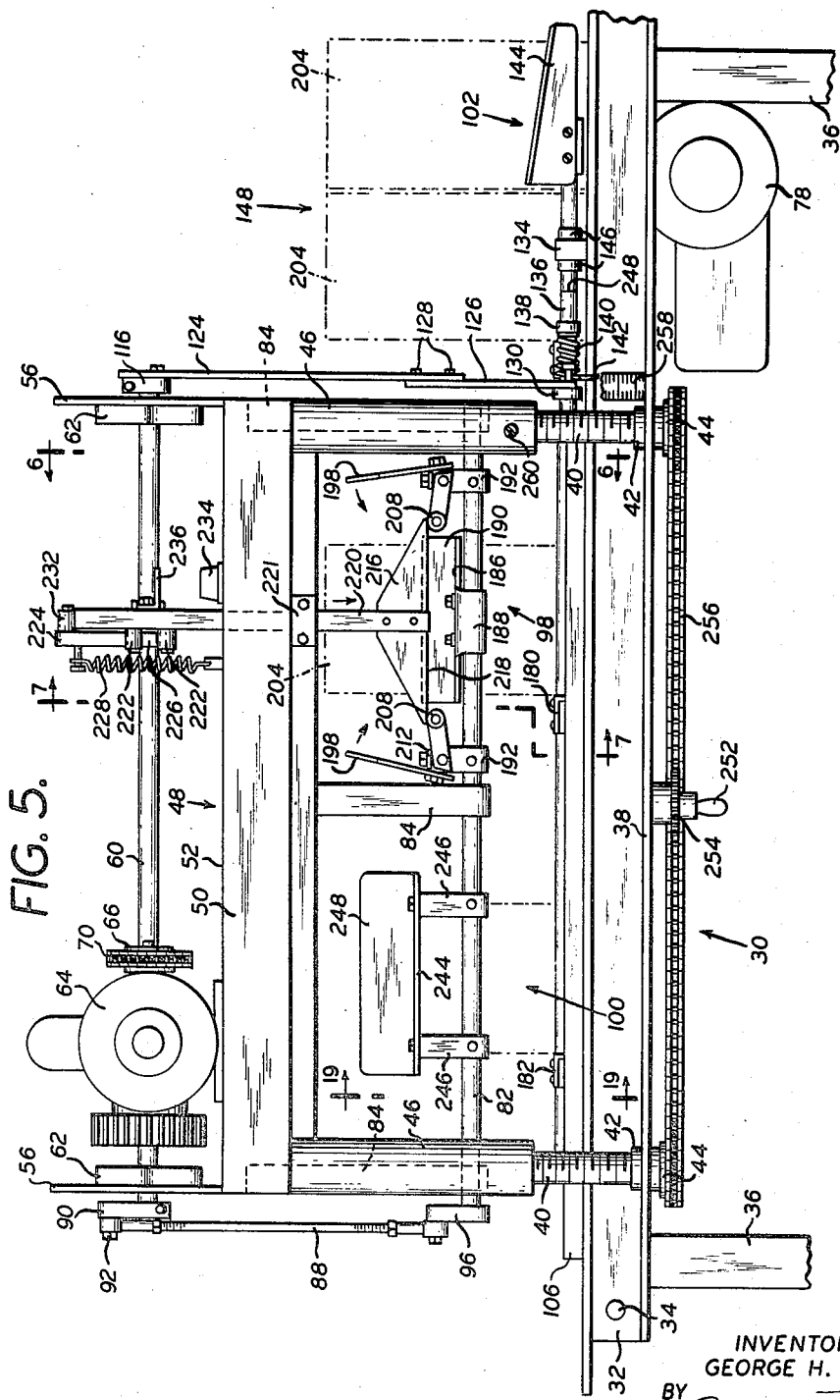

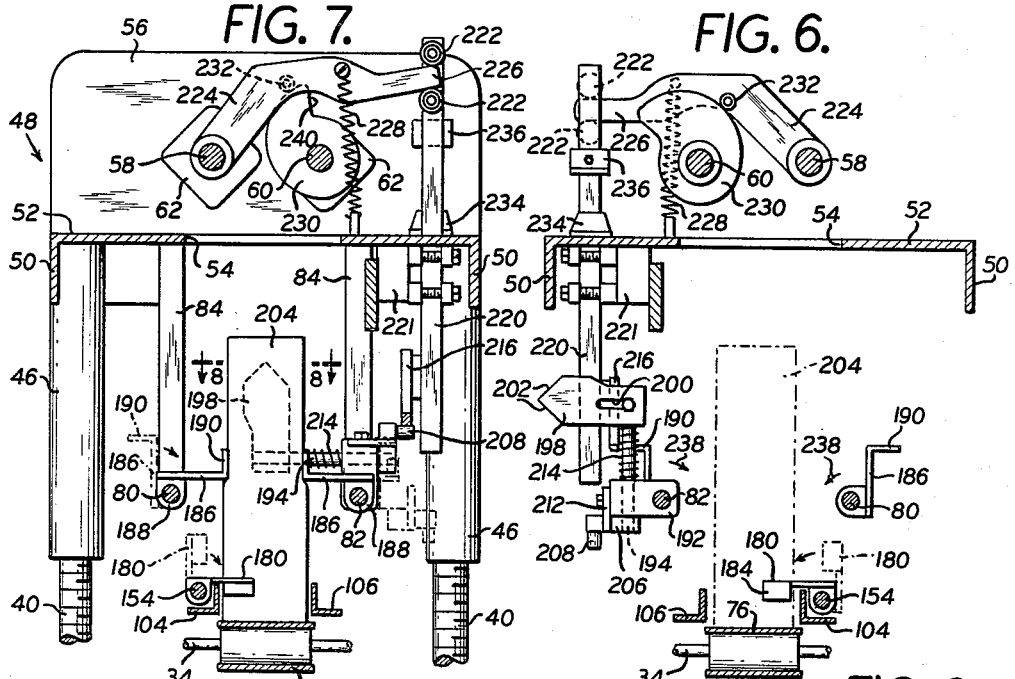

Feb. 23, 1960 G. H. FRY 2,925,695
BAG HANDLING MACHINES
Filed July 24, 1957 5 Sheets-Sheet 5
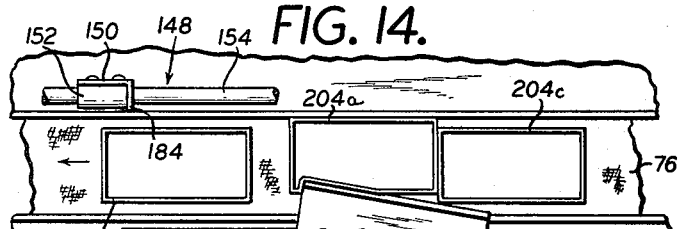
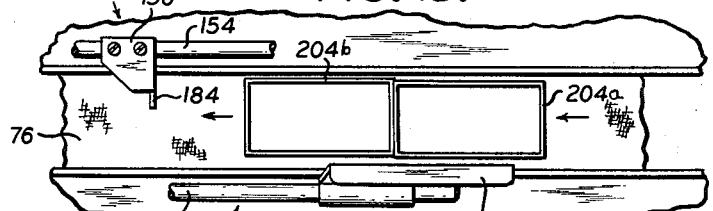
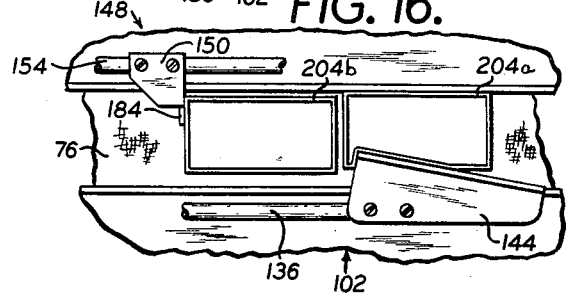
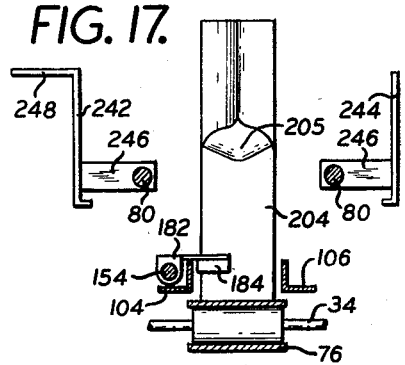
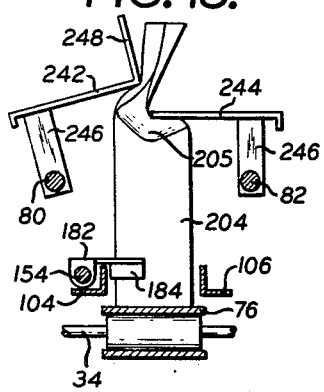
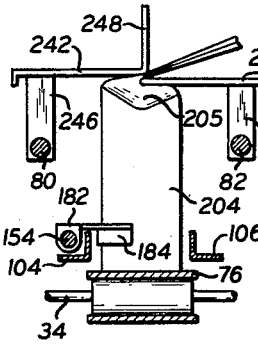
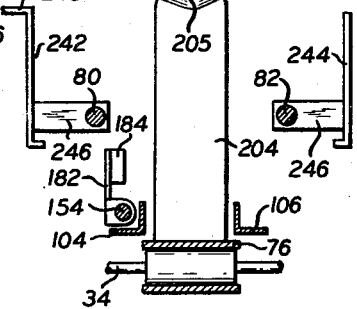
INVENTOR
GEORGE H. FRY
BY Jerome Bauer
ATTORNEY.

United States Patent Office 2,925,695
Patented Feb. 23, 1960

2,925,695

BAG HANDLING MACHINES

George H. Fry, New Hyde Park, N.Y.

Application July 24, 1957, Serial No. 673,804

26 Claims. (Cl. 53—45)

This invention relates to a bag handling machine that automatically tucks and folds closed the tops of bags after they have been previously filled with material such that they may be fed to a further device to be sealed closed.

In the general outline of the art to which this invention relates, non-rigid bags formed of paper and the like are passed through a filling structure that accurately fills the bags with a desired material and to a desired amount. During the normal course of handling the bag, it is subsequently closed and then sealed. To close the bag, the top ends thereof are tucked or gusseted and then the sides folded such that the same may be fed to a machine to be sealed closed. It is the intermediate function of closing the top of the bag by tucking the ends and folding the sides, with which the instant invention is concerned.

Accordingly, the desideratum of this invention is to receive the filled bags, close the tops of the same by tucking and folding operations performed thereon automatically in such manner that the method and apparatus may be employed wherever this intermediate function is required.

Since it is common practice to pass the empty bags through an automatically operating filling machine by means of a conveyor mechanism and because the kind of movement and speed of these conveyor mechanisms may vary in different filling machines, not only of the same manufacturer but also of different manufacturers, it is an object of this invention to provide an automatically operating bag handling machine that will be capable of receiving the bags supplied to it by the various filling machines, performing the intermediate closing function on the bags, and thence supplying the bags to a position where they may be subsequently sealed closed either by hand or by a sealing machine. In carrying out this object, a feature of the invention is the utilization of a mechanism adapted to move the bags continuously at a predetermined speed in a straight-line path through the machine and including further mechanism that will properly space the bags on the bag moving mechanism irrespective of the speed at which the bags are supplied to it from the prior filling operation.

Pursuant to the objects of the present invention, the machine is provided with mechanisms which will perform the tucking and folding operations on the bags separately at selected stations along the path of movement of the bags during the continuous operation of the bag moving mechanism, de-bulging the bags as they are moved through the machine so that they will be shaped attractively for purchase, tucking them in the proper manner to retain their attractive shape, and folding them to correctly position their walls such that they will retain their folds during the subsequent sealing operations to be performed thereon.

It is another object of the invention to provide a machine that may be readily interposed and employed between filling and sealing machines, operating automatically to receive bags from the filling machine to close them, and then supplying the same to the sealing machine. As such, the invention is capable of performing the closing function intermediate the filling and sealing machine operations, a function generally known in the packaging industry as the intermediate closing stage of the normally three distinct and separate stages, namely, the initial filling stage, the intermediate closing stage and the final sealing stage.

Other and further objects of my invention reside in the structures and arrangements hereinafter more fully described with reference to the accompanying drawings in which:

Fig. 2 is a top plan view of the machine.

Fig. 3 is a front elevation.

Fig. 4 is a rear elevation.

Fig. 5 is a side elevation of the machine.

Fig. 6 is a section of the tucking station taken at approximately 6—6 of Fig. 5, but with the parts thereof in open position.

Fig. 7 is a section of the tucking station as taken along line 7—7 of Fig. 5 and with the tucker plates in tucking position.

Fig. 8 is a section taken along lines 8—8 of Fig. 7.

Fig. 9 is a fragmentary view of one of the tucker arms in tucking position while Fig. 10 shows the arm in its position immediately prior or after the tuck.

Fig. 11 is a section similar to Fig. 7 with the tucker arms in tuck forming position.

Fig. 12 is a fragmentary section of Fig. 11 taken at 12—12.

Fig. 13 is a view of the bag after it has been tucked.

Fig. 14 is a plan view of the delaying or spacing station in operation and the first bag stop open.

Fig. 15 shows the delay station open and the bag stop in operation while Fig. 16 shows the intermediate position with the delaying arm moving into operation and the first stop arm moving to its inoperative open position.

Fig. 17 is a section of the folding station with a bag stopped in position preparatory to the folding operation.

Fig. 18 is a section showing the folding arms moved into partial folding position while Fig. 19 shows the completed folding operation as taken along lines 19—19 of Fig. 5.

Fig. 20 is a section of the folding station in completely open condition, and

Fig. 21 is a perspective view of the bag in its tucked and folded condition.

Figure 1:
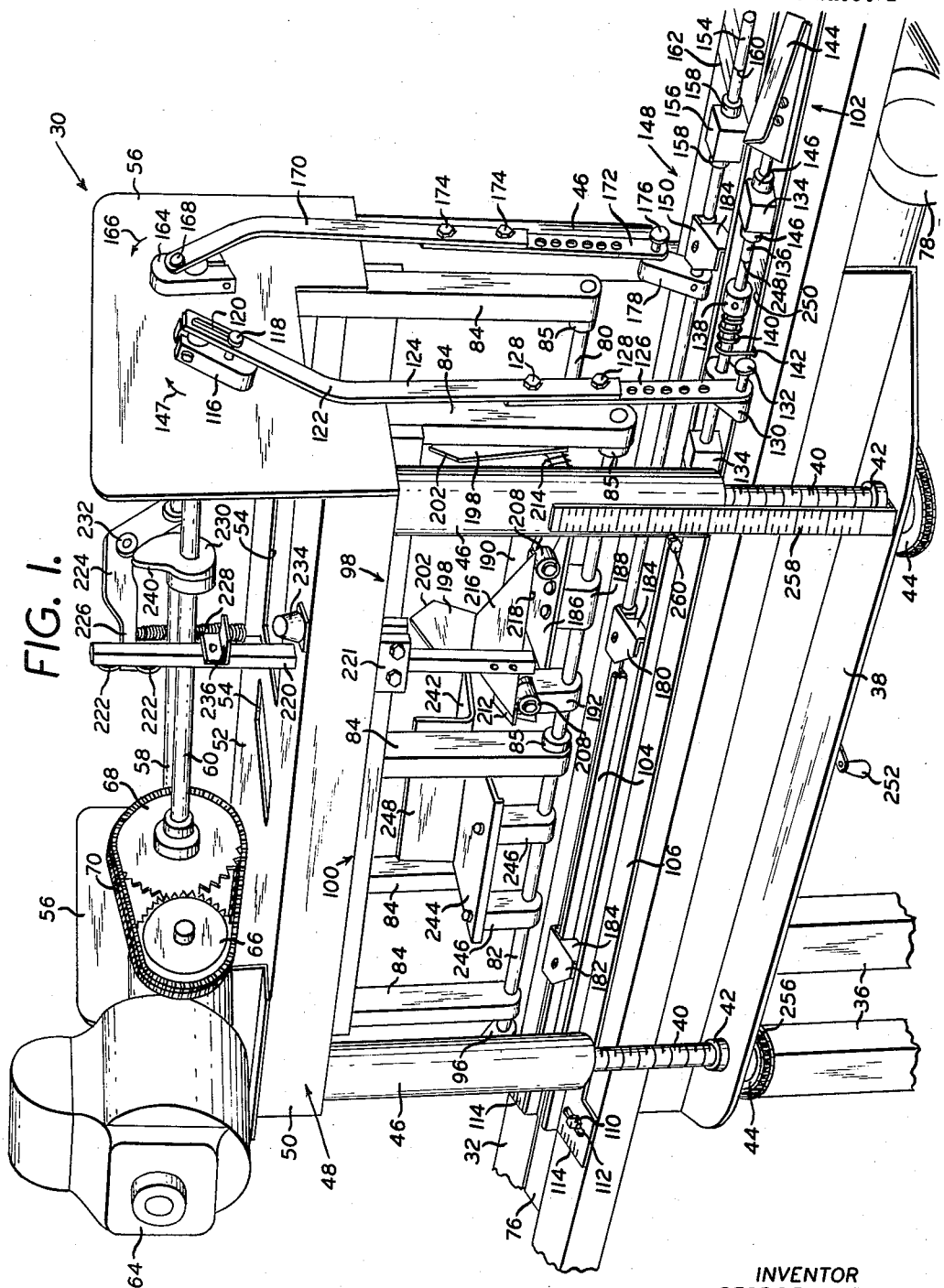
Fig. 1 is a perspective view of the bag handling machine in accordance with the teaching of the invention.

Referring now to the figures of the drawings, the inventive bag handling machine is generally identified by the numeral 30. The machine comprises a bed having a pair of spaced bed rails 32 secured together in their spaced relationship in any convenient manner—for example, by the cross bolts 34 (Figs. 3, 4 and 5).

Supporting the spaced rails 32 in their spaced condition above the floor or ground are a plurality of legs 36 that are secured at their upper ends to the undersides of the bed rails 32. Marginal ledges 38 are mounted on lateral transverse sides of the machine 30 and secured to the bed rails 32 in any convenient manner. The marginal ledges extend longitudinally along a portion of the length of the machine (Fig. 1) and support the operating mechanisms of the various stations above the bed rails.

Constituting the support is a series of four adjustable rods 40, each bearingly mounted at 42 in the marginal ledges 38. Each rod 40 is threaded throughout its length, the threaded portion extending upwardly from the marginal ledges 38 while the lower or bottom end carries a sprocket or gear wheel 44 fixed thereto for rotation therewith. The rods 40 are therefore adapted to rotate within their bearing mountings 42 without, however, moving up or down with respect to the ledges 38.

Threadably engageable with each rod 40 is a mounting socket 46. The mounting socket 46 is adapted to move longitudinally with respect to the rod during the rotation of the latter. Because the rods 40 are restricted from longitudinal movement relative to their ledges 38, any rotation of the same will cause a displacement of the sockets 46, upwardly or downwardly, as the case may be, according to its direction of rotation.

The mounting sockets 46, being in the nature of internally threaded sleeves, are each secured at their upper ends to a framework generally identified by the numeral 48. The framework 48 is constructed of sturdy material having downwardly turned marginal edges 50 (Figs. 1, 5, 6, 7, and 11). The marginal edges enclose about the transverse sides of the adjustable sockets 46, thereby serving to more completely retain the framework 48 to the sockets 46. The framework illustrated in the drawings has a surface 52 that is preferably, although not necessarily, perforated at 54 to provide visual inspection of the operating mechanisms incorporated therebeneath.

The ends of the framework terminate in upstanding flanges 56 that may either be secured as separate members to the ends of the framework 48 to form an integral part thereof, or bent upwardly therefrom during the forming of the framework 48. The flanges 56 serve to mount a pair of actuating or operating shafts 58 and 60. Each shaft 58 and 60 is slightly longer in length than the longitudinal distance between the spaced flanges 56 and are accordingly mounted for rotation at their opposite ends in bearings 62 secured to the respective end flanges. Each of the opposite ends of the shafts 58 and 60 extending slightly beyond the end flanges 56, are utilized in the operation of linkage mechanisms to be described subsequently.

In order to provide for the operative rotation of the shafts 58 and 60, there is mounted on the surface 52 of the framework 48, a driving motor 64 (Figs. 1, 2 and 5). The motor 64 has secured to its drive shaft a sprocket wheel or gear 66. A further wheel or gear 68 is mounted on the operating shaft 60 for conjoint rotation therewith. The two wheels 66 and 68 are joined by a sprocket or chain 70 which serves to transmit the drive from the motor 64 by way of its wheel 66 to the gear wheel 68 of the operating shaft 48, thereby resulting in the rotation of the shaft 60.

It will be noted that the gears 66 and 68 are so proportioned as to provide a specific rotative timing of the shaft 60 and the mechanism operated thereby in accordance with the timed operation of elements to be subsequently described. The driving motion of the operating drive shaft 60 is transmitted to shaft 58 for synchronous conjoint rotation by the operation of a pair of meshing gears 72 and 74, one secured on each of the shafts 60 and 58 respectively.

Laterally positioned between the spaced bed rails 32, and slightly below the level height of the same, is a bag moving mechanism in the form of a continuous conveyor belt 76 (see Figs. 2, 3 and 4). The conveyor belt 76 is provided with a flat uninterrupted surface on which bags to be closed by the instant machine 30 are conveyed in a straight-line path through the various operating stations of the machine.

The conveyor belt 76 may be as long in length as desired. Fig. 2 illustrates the belt extending from a point prior to the first station of the machine to a point beyond the last operating station of the machine. This is for illustration purposes only, it being recognized that the concept of the invention is not to be limited by the longitudinal extent of the conveyor belt 76. It is implicit in the disclosure that the belt must be capable of conveying or moving bags from a point prior to the first operating station to a longitudinal point beyond the last station.

The operations to be performed on the bag prior to the time they are deposited on the conveyor belt and subsequent to the closing operation of the machine, forms no part of this invention. Hence the conveyor belt need only be so long in length that it will receive bags and transport them from the very beginning of the operating stations of the machine to a point beyond the last operating station.

The conveyor means 76 therefore may extend about the bed rail spacer rods 34 and is adapted to be operated by a continuously operable separate constant speed motor 78. For simplicity of arrangement, this motor is illustrated in Fig. 5 as being mounted from the underside of the bed rails 32. The operation of motor 78 is independent from that of motor 64 except, however, as the description proceeds, it will be readily understood that the timed conveying movement of the belt 76 is in a specific relationship with the rotation of the drive shafts 58 and 60.

A pair of bag closing shafts 80 and 82 are positioned on opposite sides of the path that the bags follow as they are moved by the conveyor 76 through the machine 30. The shafts 80 and 82 are separated in their depending relationship from the framework 48 by brackets 84, the number and size of such brackets being variable in accordance with the details of construction of the machine 30. To provide for the efficient operation of the bag closing shafts 80, the same may be mounted in bearings 85 provided in the supports 84.

The two shafts 80 and 82 are substantially in parallel relationship and are adapted to be adjusted relative to the moving surface of the conveyor belt 76 in a manner to be described. Shafts 80 and 82 are adapted to oscillate in a timed relationship with each other and in accordance with the driving operating rotation of the shafts 58 and 60 respectively. To assure this cooperating relationship, there is provided at the rear end of the machine 30, a pair of driving links 86 and 88.

The link 86 interconnects the drive shaft 58 with the bag closing shaft 80 while the link 88 interconnects the drive shaft 60 with the bag closing shaft 82. The rotary motion of the drive shafts 58 and 60 is transmitted and transposed to oscillating motion to their respectively interconnected bag closing shafts 80 and 82 by similar linking structures. For example, each drive shaft 58 and 60 has clamped at its rear end, a link arm 90 for rotation with its respective drive shaft wherein see Fig. 4.

The interconnecting links 86 and 88 are each pivotally connected to the link arms 90 and 92 so that the rotation of the link arms 90 in accordance with the direction of rotation of their respective drive shafts 58 and 60, as shown by the arrows 94, is transmitted by way of the links 86 and 88 to a lower oscillating arm 96. The oscillating arms 96 are also securely mounted to the rear end of each one of the shafts 80 and 82. The eccentric location of the pivots 92 causes the links 86 and 88 to assume an up-and-down motion. This up-and-down motion is thence transmitted by way of the oscillating arms 96 to the bag closing shafts 80 and 82. To allow for accurate adjustment of the inter-connecting links 86 and 88, each of them is provided with a threaded turnbuckle arrangement (not numbered) at its upper and lower ends.

The oscillating rotation of the shafts 80 and 82 is employed to tuck or gusset the ends of the bag and subsequently the fold of the sides of the bag. To more clearly understand these two operations performed on the bag, the description of the machine is herein divided into two stations, namely, the tucking or gusseting station generally identified in the drawings by the numeral 98, and the folding station generally identified by the numeral 100, each of which will be described in greater detail.

In order to provide a clearer understanding of the operative details of the bag closing machine 30, it is important to recognize that the instant machine is designed to be employed intermediate the stages of initially filling the bag with the desired amount and type of material and the final stage of permanently sealing the top of the bag closed. As noted previously, when the bags are filled with material, they may be moved through a filling machine automatically or manually handled at varying speeds. Hence it is absolutely necessary for any machine that is to be successfully employed in the intermediate stage of closing the filled bags, that the same be able to receive such bags at the speed of operation of the filling machine or procedure.

The instant bag closing machine 30 is designed with this purpose in mind. It is within the concept of this invention to receive bags filled with material and to automatically perform closing operations on the same regardless of the speed of operation of the filling mechanism supplying the bags to the instant machine 30 or the speed at which the bags are subsequently sealed closed after they have been passed through the instant machine.

It is for this reason that the conveyor belt 76 is made to extend forwardly beyond the point of entry of the bags into the machine 30. The conveyor belt 76, having an uninterrupted unobstructed surface, is continuously moved by its constant speed motor 78, thereby being adapted to continuously move the bags received on its surface at its forward end in a straight-line path through the machine 30. However, because as previously noted, such bags are supplied to the conveyor belt 76 surface at varying speeds, it is necessary to accurately space each bag in a predetermined relationship each from the other so that the tucking and folding operations may be properly performed thereon.

To do this, the machine 30 is provided with a spacing or delaying station at a point of initial entry into the machine. This station is generally identified by the numeral 102 (see Figs. 1, 2 and 14 to 16).

Located in parallel relationship along opposite sides of the conveyor belt 76, is a pair of angled members 104 and 106. Each of these members 104 and 106 have an upstanding leg 108 that is bent at substantially right angles to the base of the members. Hence the members may be termed "right-angle members." Each angled member 104 and 106 is adjustably mounted to the respective bed rails 32 for transverse movement toward and away from the conveyor belt 76. This is accomplished by employing a screw and slot connection 110 and 112 to mount the angled members on their respective bed rails 32. To facilitate accurate transverse adjustments of the angled members 104, the screw 110 provides a fixed point relative to which the indices 114 provided on the angled members 104 and 106 may be adjusted for a purpose to be described.

*Delaying or spacing station*

The operation of the delaying or spacing station mechanism 102 is controlled by the rotation of drive shaft 60 similar to the controlled operation of the bag closing shafts 80 and 82. That is to say, the end of the drive shaft 60 extending forwardly beyond the end of the upstanding flange 56 of the framework 48, has clamped to it an arm 116. A pivot pin 118 is mounted on the arm in an eccentric position relative to the center of rotation of the shaft 60 and extends through a slot 120 provided at the upper end of an adjustable link 122.

The adjustable link 122 is formed in two parts, namely, the upper link 124 and a lower link 126. The upper and lower links are secured together for relative lengthwise adjustment by any well-known releasable fastening means such as bolts 128. It will be noted that the lower link 126 is provided with a plurality of spaced openings. Each of these openings is predeterminately spaced from the other to permit the lengthening or shortening of the adjustable link 122. It will be readily recognized that by adjusting the links 124 and 126 relative to each other and relocating the bolts 128 in desired ones of the openings in the lower link 126, the length of the overall link 122 can be varied.

The lower end of the adjustable link 122 is swingably connected to an oscillating transmission arm 130 at 132. Bearingly mounted in blocks 134 that are secured in longitudinally spaced relationship on top of the angled member 106 for transverse adjustment relative to the belt 76, is a delaying or spacing shaft 136 that is adapted to be oscillated by the arm 130 since the arm is fixedly secured to the shaft. The shaft 136 is provided with a collar 138 that secures one end of a spring 140 wound about the shaft to the same while the other end 142 of the spring is bent inwardly to project under the angled member 106 and is retained in position therebeneath. Fastened on the forward end of the shaft 136 is a delay or spacing arm 144 for oscillating movement with the shaft. A pair of lock collars 146 positioned on opposite sides of the leading block 134 secures the arm 144 in longitudinal adjustment along the path of movement of the conveyor belt 76.

The spring 140, normally engaged at 142 beneath the angled member 106, is pre-tensioned to act upon the collar 138 to rotate the shaft 136 and its spacing arm 144 into the path of movement of the conveyor belt 76 as shown in Figs. 14 and 16. The normal position of the arm 144 is located well into the path of the bags moved by the conveyor belt 76.

The delaying arm 144 is lifted out of the path of movement of the bags during the rotation of the shaft 60 and the arm 116 in the direction of arrow 147 (Figs. 1 and 3), when the pivot pin 118 moves through its lost-motion connection with the slot 120 and finally comes to rest and to exert pressure upon the lower end of the slot. At this point, the bearing engagement of the pivot pin 118 against the lower end of the slot 120 causes the adjustable link 122 to move downwardly and, in turn, swings the oscillating arm 130 downwardly with it. The downward movement of the oscillating arm 130 is transmitted to the shaft 136, overcoming the normal prestressed urging of the spring 140 to rotate the shaft 136 and its attendant delay or spacing arm 144 upwardly and out of the path of the bags being moved on the continuously moving surface of the conveyor belt 76.

Each subsequent station along the path of movement of the bags is provided with a stop device that is adapted to stop the bag in precise relationship to the operating station, and for the complete period of operation on the bag. It must be comprehended that despite the stopping of the bag at each operating station, the belt 76 and its unobstructed, uninterrupted bag-moving surface continuously moves relative to the operating stations and through the machine instantaneously carrying the bag with it upon release of the delay or spacing arm 144 and the stopping devices to be described.

*Bag stopping mechanisms including first bag stop station*

Immediately following the lifting of the delaying or spacing arm 144, the bag is moved by the conveyor 76 into the machine 30 wherein it encounters the first bag stopping station generally identified by the numeral 148. The first bag stopping station comprises a stop member shaped in the form of an arm 150. The arm 150 is mounted on a block 152 that is, in turn, secured in fixed position along the length of a stop shaft 154. Stop shaft 154 is bearingly mounted along portions of its length in mounting members 156 and in turn secured by such members 156 to the base of the angled member 104. The mounting blocks 156 abut the upstanding leg 108 of the angled member 104 to locate the stop member 150 well into the path of movement of the bags that are adapted to be continuously passed through the machine by the conveyor belt 76.

As in the case of the delay shaft 136, stop shaft 154 being mounted on the angled member 104, is movable transversely and as part of the same relative to the bed 32 and the conveyor belt 76. Hence the shaft 154 is fixed for transverse movement with the angled member 104 but, at the same time, it is permitting longitudinal movement relative to both the angled member 104 and the bed 32.

To facilitate this relative longitudinal movement, there is provided on the shaft 154 at sides along portions thereof adjacent to the forward block 156, a pair of releasable collars 158. Upon release of the collars 158, the shaft 154 may be slidably adjusted longitudinally relative to all of the mounting blocks 156 and along the length of the machine 30 in such manner that a marker or pointer 160, defined at the leading end of the shaft 154, may be aligned with a set of stop shaft indices 162 for accurate lengthwise adjustment of the stop member 150.

The stop shaft 154 is adapted to be oscillated by the rotation of the drive shaft 58. Clamped to the forward projecting end of the drive shaft 58 is an arm 164 adapted to rotate in the direction of the arrow 166. Arm 164 is connected at the eccentrically located pivot 168 to an adjustable link having upper and lower members 170 and 172. The link members 170 and 172 are connected and adjustable in exactly the same fashion as was described with respect to the adjustable link 122.

The upper and lower portions of the link may be releasably secured together by any suitable fastening means 174 and adjusted in height by selecting desired openings provided in the lower link 172. The lower link is swingably connected at 176 to an oscillating arm 178. The arm 178, in turn, is fixed to the shaft 154 to oscillate the same. Hence rotation of the shaft 58 will cause the stop shaft 154 to oscillate, thereby periodically moving the stop member 150 of the first bag stopping station 148 into and out of the path of movement of bags which are adapted to be continuously conveyed through the machine 30 by the conveyor belt 76.

As previously noted, each bag closing station 98 and 100 is provided with a bag stopping device. These bag stopping devices are exactly the same in detail as the stop member 150 previously described and may be seen more clearly in Figs. 1, 2, and 5. The bag stopping device of the tucking or gusseting station 98, is identified by the numeral 180 while the bag stopping device employed at the folding station 100 is identified by the numeral 182.

Each bag stopping device 150, 180 and 182 is fixedly mounted in the same manner on the stop shaft 154. Each such device comprises a member having a leg 184 that extends downwardly as close as possible to the unobstructed continuously moving surface of the conveyor belt, and project along the transverse width of the belt a distance sufficient to obstruct the continued movement of a bag therewith.

For this reason the leg 184 is spaced a slight distance from its mounting block 152, so that it may project over the upstanding right-angle leg 108 of the angled member 104, accommodating the same between itself and the block 152. Because each stop member 150, 180 and 182 is mounted on the same stop shaft 154, they all move into and out of bag stopping relationship with the surface of the conveyor belt simultaneously and along the length of the straight-line path of movement of the machine.

It is deemed worthy to mention at this time that the arms 116 and 164 are predeterminately positioned with respect to each other on their respective shafts 60 and 58 to assure the periodic movement of the spacing arm 144 into the path of movement of the bags when the stop arm member 150 is lifted out of the path of movement of the bags and into its inactive position as shown in Fig. 14. Conversely, when the stop arm member 150 is rotated by the shaft 154 into its active position into the path of movement of the bags, the spacing arm 144 is lifted to its inactive position as shown in Fig. 15, out of the path of movement of the bags. For a purpose which will presently be described, it is here mentioned that the longitudinal space between the spacing arm 144 and the first bag stopping station 148, having the stopping arm member 150, is equal to and at times slightly greater than the length of a bag to be passed through the machine by the conveyor belt 76.

*Tucking or gusseting*

In the instant invention, the tucking or gusseting operation performed at station 98, comprises a plurality of step operations. So that the ensuing description will be more readily understood, it is here noted that station 98 is intended to square or debulge the side walls of the bags whose top is to be closed. This debulging function performed on the bag attractively shapes the same. It also serves to move the contents compactly into the upper portion of the bag, during which time tucking devices are brought into operation to form the end walls of the bag downwardly against the contents, thus taking advantage of the compressed contents and the abutment that the same provide. This results in an accurate attractively tucked appearance.

The tucking or gusseting station 98 may be seen more clearly in Figs. 1, 2, 3 and 5 to 12 while Fig. 13 of the drawings depicts a folded or gusseted bag. It comprises a pair of compacting sidewardly acting debulging or squaring arms 186, each of which is fixedly mounted at 188 for oscillating movement with respective bag closing shafts 80 and 82. The arms 186 are provided with fingers 190 that are adapted to move into compacting abutment with the side walls of a bag to "square" the same so that the normally curved walls of a bag filled with material are now flattened and assume a straight wall appearance.

Also mounted on the shaft 82 but longitudinally spaced from the ends of the compacting arm 186 mounted on the same shaft, is a pair of pivot blocks 192. The blocks 192 are secured to the shaft 82 for oscillating rotation therewith. Each pivot block 192 mounts a pivot or swing rod 194 eccentrically positioned with respect to the bag closing shaft 82. The inner end of the swing rod 194 is fixed in a mounting block 196 that has secured to its outer face a tucking or gusseting arm 198. The tucker 198 is provided with a slot 200 which permits adjustment of the same relative to its mount 196.

It will be noted that the operating end of the arm 198 is tapered at 202 to a point so that the tuck or gusset made in the bag top assumes the shape of the tapered walls 202. Reference at this time is made to Fig. 13 wherein the top of a bag is shown with its tuck or gusseted ends 205 having the shape of the tapered walls 202 of the tucker arm 198.

In order to swing the arms 198 into tucking or gusseting position, the swing rod 194 extends beyond its mounting in the pivot block 192 and is secured for movement with a cam actuated member 206. The cam actuated member 206 carries a bearing or roller 208 that is eccentrically positioned thereon relative to the pivot 194. The top 210 of the member 206 is inclined at an angle to the vertical and cooperates with the under surface of a stop plate 212 locked in position at the top of the mounting block 196 to normally retain the member at a corresponding angle to the vertical.

The cooperation between the top surface 210 and the under surface of the stop plate 212, limits the downward swinging movement of the cam actuator member 206 and, accordingly, the swinging movement of the tucking or gusseting arm 198. This serves as a safety feature to insure that the tucking function performed at the station 98 will not in any way injure the bag 204.

A spring 214 is wound or wrapped about the rod 194 and is secured at its rear end to the pivot block 192 and at its forward end to the mounting block 196. Spring 214 is pre-tensioned to lift the arm 198 to its normally inactive position and to move the cam actuated member 206 and its bearing 208 upwardly, disengaging the cooperation between the surfaces 210 and 212. This positions the surface 210 downwardly away from the surface 212 and the bearing 208 into initial operating position.

Cooperating with both bearings or rollers 208 simultaneously, is a quick operating cam 216. Cam 216 is normally located in its inactive position ready to rest upon the longitudinally spaced rollers 208 as shown in Figs. 1 and 5. Cam 216 being quick operating, has a flat bottom roller contacting operating surface 218. In order to assure its quick or rapid operation on the rollers 208, the remaining walls of the cam 216 are tapered or cut away from the operating surface 218.

Cam 218 is secured to a bar 220 that extends upwardly through the framework 48 and is guided at 221 for reciprocating vertical movement therein. The cam actuating bar 220 has a pair of frictionless bearings 222 that are mounted on one end of the bar and vertically spaced from each other to accommodate and guide therebetween a cam-actuated lever 224.

The cam-actuated lever 224 is mounted for free rotation on the drive shaft 58 and limited from relative movement along the length thereof in any suitable manner. Its rear actuated portion assumes the shape of a finger 226 that is retained in position between the frictionless bearings 222 on the bar 220 for constant engagement therewith. Its cooperative engagement with the rollers of the bar 220 thus reciprocates the bar in accordance with the actuated movement of the lever 224.

Lever 224 is urged by a spring 228 into constant surface cooperation with a bag tucking-timing cam 230. Spring 228 is connected at its upper end to the lever 224 and at its lower end to the framework surface 52. The normal urging of the spring 228 thereby serves to place a frictionless follower 232 mounted on the lever 224 into constant engagement with the operating surface of the cam 230 that is fixed to rotate with the drive shaft 60.

The force exerted by the spring 228 against bar 220 is absorbed by a buffer 234 composed of rubber or other resilient material that is abutted by a buffer plate 236 securely mounted on the bar 220. The cooperation between the buffer plate 236 and buffer member 234 occurs when the bar 220 is moved to its lowermost position after operating the gusseting or tucking arms 198. The resilient cooperation between the buffer plate and buffer member thus absorbs any shock produced during the rapid forceful downward movement of the bar 220.

The tucking or gusseting station 98 is operated in sequence with the first bag-stopping station 148. That is to say, when the arm 150 at station 148 is lifted out of the path of a bag 204 that has been stopped at that station, the bag is immediately moved forwardly with the continuously moving belt 76 to the tucking or gusseting station 98. The geared timing of drive shafts 60 and 58 is such that the bag closing shafts 80 and 82 are oscillated to position the pivot blocks 192 horizontally as shown in Fig. 6.

Because the de-bulging or compacting arms 186 are also secured to the shafts 80 and 82, they too are caused to assume the position as shown in Fig. 6. When in this position, the pathway into the tucking station 98 is cleared and open for the reception of a bag 204 that is being moved by the surface 76. The timing location of the arm 164 at the forward end of the drive shaft 58 is such that as bag 204 is moved toward and into the station 98, the stop shaft 154 is oscillated to position all stop members 150, 180 and 182 into the path of the moving bags. Hence as a bag is moved into station 98, the stop member 180 is oscillated into its path and forms an abutment against which the bag is stopped.

However, the belt 76 continues its movement and slides relative to the underside of the stopped bag 204. During the period that the bag 204 is stopped at station 98, the shafts 80 and 82 are again periodically oscillated inwardly toward each other in the direction of the arrows 238 (Fig. 6). This inward rotative movement of the shafts 80 and 82 brings the arms 186 into engagement with the opposite side walls of the bag 204 so that the fingers 190 compress the walls. The material packed in the bag normally causes the walls to assume an arcuate or bowed shape. As the fingers 190 oscillate into engagement with such arcuately-shaped walls, they compress and tightly compact the walls of the bag against the material therein. This compacting operation removes the arcuate bulges from the side walls and results in providing a bag with walls of "squared" appearance. In consequence, the material in the bag is moved compactly into the open top of the bag.

At the same time, the pivot blocks 192 have also been oscillated to their vertical positions as shown in Figs. 9 to 11. This movement positions the previously horizontally disposed rollers 208 in the same vertical plane with the quick-operating cam 216 for cooperation therewith, while also extending the swing rods 194 into the path of movement of the now stopped bag at both the forward and rear ends of the same. Springs 214 being pre-tensioned, retain the arms 198 in their vertical position as shown in Figs. 7, 8 and 10.

Throughout this movement, the timing cam 230 continues its rotation with the driving shaft 60 and causes the follower 232 to ride up along the back of the cam as shown in Fig. 6, to the top of its high point as shown in Fig. 7. When the cam 230 is rotated to where the follower 232 is at the highest point of the same, the arms 198 and attendant structure already is in the tucking position as shown in Figs. 7, 8 and 10.

However, as the cam 230 continues its rotation with the shaft 60, the follower drops rapidly along the drop surface 240 of the cam. This enables the tensioned spring 228 to move the cam 216 forcefully downwardly against the rollers 208 simultaneously, causing them to pivot in their blocks 192. In consequence, their rods 194 and their attached arms 198, are swung very rapidly into the forward and rear ends of the bag simultaneously. This rapid swinging motion causes the arms 198 to slap quickly into the ends of the bag, downwardly against the compacted material that forms an abutment for them. The rapidly acting arms cooperating with the abutting compacted material, results in clearly defined tuck or gusset creased lines of slightly weakened fibre resistance which retain their tucked shape long after the arms 198 are swung upright again. All this time the material is retained in its compacted position by the arms 186.

The pivoting of the cam-actuated members 206 is very rapid and once the widest ends of the delta-shaped cam 216 passes downwardly between and beyond the rollers 208, the springs 214, positioned about the spring rods 194, immediately lift the tucker arms 198 to their vertical position and bring the member 206 and their rollers 208 back into the position as shown in Fig. 10.

As noted previously, the downward pivoting movement of the members 206, as a result of the downward motion of the cam 216, is limited by the cooperation of the safety plate 212 and the inclined surface 210 formed at the rear of such members. Once the springs 214 have returned the arms 198 to their normally vertical position and the actuated members 206 to the position shown in Fig. 10, continued rotation of the drive shafts 58 and 60 oscillate the bag closing shafts 80 and 82 to remove the attendant structures thereon from the path of movement of the bags 204 to the starting position as shown in Fig. 6. Timing cam 230, fixed to shaft 60, continues to rotate with it and again assumes the sequential position as shown in Fig. 6.

Immediately upon completion of the tucking or gusseting operation, the stop shaft 154 again is periodically oscillated to remove the tucking station stop 180 from the path of the now tucked bag 204. The released bag immediately moves without hesitation with the continuously moving surface of the belt 76.

Referring to Fig. 13, the completed tucked bag 204 is shown with the tucks 205 formed therein at its forward and rear ends.

Folding

After the bag 204 is released from the tucking or gusseting station 98, it immediately moves forward in a straight-line path with the belt 76 to the folding station 100 wherein it is again stopped in its longitudinal movement by the timed operation of the stop member 182, despite the continued movement of the unobstructed belt surface 76 therebeneath. The timed sequential oscillating movement of the bag closing shafts 80 and 82 continues.

Fixedly secured on each of the bag closing shafts is a folding arm 242 and 244. The arm 242 is mounted for oscillation with the shaft 80 by a support or series of supports 246 in a manner similar to the mounting of the arm 244 on the shaft 82. Each arm 242 and 244 is slightly longer in length than the bisected width between the shafts 80 and 82.

Arm 244 comprises but a single flat surface that is adapted to move inwardly along one side of the tucked bag 204 slightly prior in time to the folding movement of the other arm 242. Arm 242 includes an upturned leg 248 that closes downwardly against the top of the bag as shown in Figs. 18 and 19 to bend the same over the end of the arm 244. This overlapping cooperation of the arms 244 and 242 not only folds the tucked sides of the bag toward each other but also indents to score them slightly, weakening their fibres along a line of one side of the bag so that the folded top will retain its fold and, in consequence, lean slightly toward the weakened side, or side of least resistance, as shown in Fig. 21.

It will be understood that because the folding arms of the station 100 are secured to the bag closing shafts 80 and 82, their operation is performed simultaneously with the operation of the station 98, while the operation of the stops 150, 180 and 182 is also simultaneous. Hence upon the outward oscillation of the shafts 80 and 82, the fold arms 242 and 244 are swung out of the path of movement of the now folded bag 204 to assume the position shown in Fig. 20. The subsequent lifting of the stop 182 from the path of the bag 204, immediately permits the bag to continue its forward movement with the continuously moving belt 76, out through the rear end of the machine 30.

Operation

When starting the bag handling machine 30, the conveyor belt motor 78 and driving motor 64 are energized. As a result, the conveyor belt 76 moves continuously in a straight-line path through the operating stations 102, 148, 98 and 100 continuously and in sequence. Normally, the unobstructed surface of the belt 76 would convey any bag 204 placed or deposited thereon at the forward end of the machine 30, through the machine and out the rear end thereof, if no operating mechanism were interposed in its path. However, because machine 30 is adapted to receive bags supplied to it from other devices or mechanisms operating at various speeds, it is necessary to accurately space each bag before it enters into the bag closing stations.

To do this, bags received at the forward end of the machine on the continuously moving surface of the belt 76, are encountered by the delaying or spacing station 102 which comprises the delaying or spacing arm 144. The operation of the arm 144, resulting from the lost-motion connection 118 and 120, is such as to permit the angulated arm to engage each bag 204 before the same enters the subsequent operating stations of the machine 30. An exaggerated engagement of the arm 144 with the bags 204 is shown in Figs. 14 and 16.

As each bag is conveyed by the unobstructed surface of the belt 76, it is delayed at station 102, in its continued movement, by delaying or spacing arm 144. However, during the time that the bag 204 is delayed at station 102, the belt 76 continues its straight-line movement through the machine unobstructed. After a predetermined distance of conveying movement of the belt 76, the arm 144 is automatically lifted against the normal tension exerted on it by the spring 140, by the operation of the pin 118 engaging in the lower end of the slot 120.

As arm 144 lifts rapidly out of engagement with the bag 204, the bag is immediately moved forward by the surface of the belt 76 without the incidence of slippage therebetween. Since the engagement of the delaying arm 144 with the bag 204 is directed along a side of the same and as close as possible to the surface of the belt, the bag immediately moves with the belt without fear of inertia creating slippage between it and the conveyor belt surface.

Delay or spring station 102 operates periodically in opposition to the operation of the stop shaft 154 and its stop members 150, 180 and 182. That is to say, when the delay station 102 is inoperative wherein its arm 144 is lifted out of the path of movement of the bags, the stop members 150, 180 and 182 are lowered into the path of the moving bags.

As previously noted, the longitudinal distance along the belt between the delay or spacing station 102 and the first bag stopping station 148, including the stop 150, is at least equal to and may be slightly greater than the length of the bag 204, thereby accommodating and assuring that only one bag will be positioned between the delaying station and the subsequent first bag stopping station at any time. This may be more clearly seen in Fig. 16 wherein arm 144 is about to move into delaying engagement with the bag 204a while the stop 150 is about to lift out of the stopping engagement with the bag 204b. Hence every bag conveyed through the machine 30, is delayed and predeterminately spaced along the continuously moving belt 76 from the preceding bag by the arm 144.

After the stop shaft 154 has oscillated to lift its stop arm 150 from the station 148, the bag 204b thereat (Fig. 16) is permitted to again immediately move forwardly with the unobstructed surface of the continuously moving belt 76, while the second bag 204a (Fig. 14) is delayed for correct spacing along the belt 76. From what has been described, it will be recognized that before each bag passes through the machine, it is delayed relative to the surface of the continuously moving belt 76 to correctly space the same along such surface. Subsequently, the spaced bags are each stopped from continued movement with the unobstructed continuously moving belt surface at the first bag stopping station 148 by the stop 150. The first bag stopping station thus insures that but only one bag at a time will enter into the subsequent bag closing stations 98 and 100.

After the bag 204b is permitted by stop 150 to continue its movement through the machine with the conveyor belt 76, it is conveyed into a straight-line path to station 98 wherein it is predeterminately stopped by the operation of the stop member 180. This stopping occurs despite the continued movement of the conveyor belt 76. Hence slippage between the bag and the belt occurs and, for this reason, the belt is provided with an unobstructed surface.

While the bag 204b is stopped at the tucking or gusseting station 98, bag 204a is released from station 102 by the rapid lifting of the arm 144. Upon its release, bag 204b is immediately conveyed by the continuously moving belt 76 to the first bag stopping station 148 whereat the member 150, like stop 180, is also in bag stopping position. Hence bag 204a is similarly stopped at the first bag stopping station 148 simultaneously with the retention of bag 204b at the tucking or gusseting station 98. In the meanwhile, a third bag 204c (Fig. 14) is moved into position also to be delayed and spaced along the surface of the belt 76 by the arm 144 of the station 102.

While bag 204b is stopped at station 98, the squaring arms 186 are pivoted in the direction of the arrows 238

(Fig. 6) against the opposite side walls of the bag, compressing the material therein, attractively squaring and removing the bulges from the sides of the bag and forcing displaced material upwardly into the top of the bag. At the same time, the tucking or gusseting arms 198 are swung from their position out of the path of movement of the bag as shown in Fig. 6, into the path of movement of the bag, and at opposite ends thereof as shown in Fig. 7. This oscillating of the shafts 80 and 82 brings the rollers 208 into aligned position for its cooperation with the quick-operating cam 216.

Since timing cam 230 and shafts 80 and 82 operate in response to the rotation of drive shaft 60, continued rotation of the cam will cause its follower 232 and the lever 224 to lift the bar 220. This positions the cam 216 wherein its lower portion rests upon the laterally extending rollers 208 of the members 206 in a manner shown in Figs. 1, 5, 7, 8 and 10. The continued rotation of cam 230 permits the follower 232 to drop along the surface 240 thereof, thereby affording the spring 238 the opportunity to quickly force the cam 216 downwardly. The rapid downward motion of the cam 216 severely pivots the members 206 and brings the tucker arms 198 into sharp rapid slapping engagement with the end walls of the bag. As the arms come down into abutment with the compacted material in the bag as shown in Figs. 9, 11 and 12, the fibres of the bag are weakened and the bag assumes the shape of the inclined walls 202 with the completed folded and squared appearance of the bag being shown at 205 in Fig. 13.

After the tucking operation has been completed, the arms 198 are immediately lifted to their vertical position by their springs 214 and the members 206 are once again moved into their laterally extending positions as is more clearly shown in Fig. 11. Continued oscillation of the shafts 80 and 82 return the compacting arms 186, and the tucker arms 198 and its attendant mechanism to the positions shown in Fig. 6 out of the path of movement of the bags.

As the tucker and compacting arms are again moved to their position in Fig. 6 out of the path of the bag, the stop shaft 154 is again oscillated, lifting the stop member 180 from engagement with the bag (204b) thereat. The released bag immediately resumes its movement with the continuously moving surface of the belt 76 until it reaches the folding station 100. At the same time, the second bag 204a, previously stopped at the first bag stopping station 148, is immediately released and resumes its movement with the conveyor 76 to the tucking or gusseting station 98.

As the now tucked bag 204b moves to the folding station 100 and the bag 204a moves to the tucking or gusseting station 98, the stop shaft 154 is again oscillated to bring the stop members 150, 180 and 182 simultaneously into stopping position. Once again the delaying or spacing arm 144 lifts to permit movement of the next bag (204c) into the first stopping station 148 wherein it is stopped by member 150.

Each bag stopped at the stations 98 and 100 are tucked and folded respectively and simultaneously while the belt 76 continues its movement therebeneath. The bag (204b) at the folding station 100, is creased and scored along a side thereof by the cooperation of the folding arms 244 and 242 to provide a line of weakened fibre resistance along the top of the bag to enable the same to retain its fold in the manner previously described and as shown in Figs. 20 and 21. Bag 204a at tucker station 98 is tucked in the manner previously described while bag 204c is stopped in readiness at station 148. In the interim a new bag enters station 102 and is delayed thereat. The sequential operation of spacing the bags by delaying the movement of the same relative to the movement of the belt, then stopping the bag at the first stopping station 148 to assure the introduction of but a single bag to the subsequent bag closing stations at any one time, is performed on each bag as it is passed through the machine 30 by the continuously moving unobstructed conveyor belt 76.

Because it is necessary to close the tops of bags of various heights, widths and lengths, the machine 30 must be adapted to operate with equal success on the same. Bags of varying widths are accommodated by adjusting the angled members 104 and 106 at their screw and slot connections 110 and 112. The preciseness of this adjustment is facilitated by the provision of the indices 114 and its cooperation with the slotted head of the screw 110 fixed in the bed rails 32. From the previous description, it will be recognized that the transverse adjustment of the angled members 104 and 106 carries with it and automatically correctly positions the stop members 150, 180 and 182 and also the delaying spacing arm 144.

Adjustment of the operating mechanisms to accommodate bags of varying lengths is accomplished by firstly positioning the stop shaft 154 such that its indicator 160 may be precisely aligned with the indices 162. It will be recognized that the adjustment of the shaft 154 will automatically position the stop members 150, 180 and 182 thereon in correct location with respect to each other and with respect to the operating stations 98 and 100.

Likewise, longitudinal adjustment of the delaying or spacing station 102 relative to the first bag stopping station 148, may be accomplished by loosening the collars 146 and adjusting the marker 248 on shaft 136 with respect to the indices 250. Alternatively, shaft 136 may be left in fixed position and arm 144 adjusted along and relative to the end of the shaft.

To accommodate bags of varying heights, it is merely necessary to adjust the framework 48 relative to the surface of the conveyor belt 76. Framework 48, being mounted on the sockets 46, is caused to move upwardly or downwardly as a unit with respect to the belt surface 76 by rotation of the rods 40. Each of the rods 40 is rotated simultaneously by the manual manipulation of a handle 252 that rotates an actuating sprocket 254 under a ledge 38.

Extending about the sprocket 254 and also about each of the sprockets or gear wheels 44 of each adjustable rod 40, is a chain 256. Rotation of the sprocket 254 by the handle 252 causes the movement of the chain 256 and the consequent rotation of each one of the rods 40. Rotation of the rods 40 is transmitted to the framework 48 by way of sockets 46, lifting or lowering the same bodily, with its attendant depending bag closing shafts 80 and 82 and the structural mechanisms fixed thereto.

The precise height of adjustment of the framework 48 may be determined by a scale 258 fixed to one of the marginal ledges 38 and to which a marker 260 mounted on one of the sockets 46, is relatively movable. Naturally any adjustment of the height of the framework relative to the surface of the conveyor belt 76 will necessitate an equivalent adjustment of the links 122, and 170 and 172.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. A bag handling machine comprising means continuously operable to move bags through said machine in a straight path, means to predeterminately position said bags relative to each other in succession along said continuously operable means, means in said machine operable on said bags successively to tuck and fold the tops and sides thereof while the same are moved through said machine by said continuously operable means, and means to stop the movement of said bags from movement with said continuously operable means as the same are tucked and folded.

2. A bag handling machine comprising spaced stations therein at which bags are tucked and folded respectively, an unobstructed continuously moving means to move said bags in a straight path through said spaced stations, means along the path of movement of said continuously moving means to space the bags in predetermined relationship to each other, and means to stop the movement of said bags at said stations and to cause the same to move relative to and along the length of said unobstructed continuously moving means as the same continues to move.

3. A bag handling machine comprising a plurality of stations each including means for performing a closing operation on a bag passed therethrough, said stations being in alignment with each other along a straight line path of movement of successive predeterminately spaced bags, means for continuously moving said bags in said straight line path through each of said stations, means operable in the path of movement of said bags to predeterminately space the same relative to each other along said continuously moving means, and a station along the path of movement of said bags prior to their passing beyond said closing stations to stop the bags from their movement with said continuously moving means during the operation of the bag closing stations.

4. A bag handling machine comprising a station including means for performing a closing operation on bags passed therethrough, means for continually moving said bags in a straight path through said station, means operable in the path of movement of said bags to stop said bags from movement with said continuously moving means and to predeterminately space the same relative to each other and along said continuously moving means, and means to stop the bags from moving with said continuously moving means during the operation of said bag closing station.

5. A bag handling machine comprising means operable to close the tops of the bags moved through the machine, a continuously moving conveyor having a surface on which the bags are moved in a straight line path through the machine and to which the bags thereon are relatively movable, the speed of said continuously moving conveyor being in predetermined timed relationship with the operation of said means to close the bags and extending beyond the forward end of said bag closing means to receive thereon the bags to be closed, means to space said bags in a predetermined relationship on said surface, and means to stop said bags from movement with said surface during the continued movement of said surface.

6. A bag handling machine comprising means operative to tuck and fold the tops of bags as the same are moved through the machine, an unobstructed endless conveyor continuously moving in a straight path extending for at least the lengths of said tuck and fold means and therebeyond to move the bags to and beyond said tuck and fold means, means to operate said tuck and fold means, means to continuously move said conveyor independently of the operation of said tuck and fold means, and means operative to cause the bags to have a relative lost-motion movement with respect to said conveyor.

7. A bag handling machine comprising stations arranged successively in a straight line through which said bags are moved to close the same, continuously moving means to convey the bags in a straight path through said stations, means on said machine prior to the movement of the bags through said stations operative periodically on said moving bags to delay the movement thereof relative to and during the movement of said continuously moving means to space said bags each a predetermined distance from the other along the said moving means.

8. A bag handling machine comprising a plurality of bag closing stations each operating in a straight path of movement of the bags to be closed, continuously moving means to move said bags in said path, means in said path to delay each bag from relative movement with the means to continuously move the bag, and means operable in said path of movement of said bags at each of said stations to stop said bags from their movement with said continuously moving means during the operation of each station and to release said bags for continued immediate movement in said path by said continuously moving means.

9. In a bag handling machine, means to continuously move bags in a straight line path, a plurality of stations along the straight line path of movement of said bags adapted to perform closing operations on the tops of the same, means operable in the path of said bags to stop the same at said stations from continued movement with said continuously moving means, and tucker means at one of said stations movable into the path of said bags while the same are stopped in their path and cooperable therewith to tuck the forward and trailing ends thereof simultaneously.

10. In a bag handling machine as in claim 9, means on said machine operable to move said tucker means out of the path of said bags.

11. In a bag handling machine as in claim 10, and means on said machine operable to move said bag stopping means out of the path of said bag simultaneously with said tucker means for immediate continued movement of said bags with said continuously moving means.

12. In a bag handling machine in which bags having open tops are adapted to be closed, continuously moving means adapted to move said bags continuously in a straight path through said machine, means movable into the path of said bags to stop the same from continued movement with said continuously moving means, and folder means operable into said path of the bags while the same are stopped to fold closed the tops of the same.

13. In a bag handling machine, means operative for closing the tops of bags, conveyor means having a continuously moving unobstructed surface extending for at least the length of the operative means of the machine to receive the bags thereon supplied to the machine and adapted to continuously convey the same in a straight path to said operative means, and spacer means mounted on said machine prior to the conveyance of the bags through said operative means to engage each bag on said surface and delay the movement of the same relative to said continuously moving surface to space each of said bags a predetermined distance relative to each other along said surface.

14. In a bag handling machine, a conveyor having a continuously moving unobstructed surface on which bags are conveyed through said machine in a straight path, spacer means movable into the path of said bags to delay the movement of the bags with said surface and to reposition the same on said unobstructed continuously moving surface, tucking means movable into the path of said bags and operable thereon to tuck the forward and trailing edges thereof.

15. In a bag handling machine as in claim 14, folding means movable into the path of said bags and successively operable thereon and simultaneously with the operation of said tucking means to fold the tops of the same.

16. A bag handling machine comprising a continuously moving conveyor having an unobstructed surface to convey bags in a straight path through said machine, spacer means movable into the path of the conveyed bags to delay their movement relative to and to reposition the same on said unobstructed continuously moving surface, tucking means movable into the path of said bags, folding means spaced from said tucking means and positioned therewith along the path of movement of said bags, said tucking and folding means each operable substantially simultaneously to tuck and fold the tops of successive ones of said bags, and stop means operable into position along said path of movement of said bags to stop the same from movement with said continuously moving unobstructed surface during the tucking and folding of the tops thereof and to release the same for continued immediate movement with said continuously moving surface.

17. A bag handling machine as in claim 16, means on said machine to adjust the height of operation of said tucking and folding means above said surface, means to adjust said spacer and stop means to vary the location at which the same will move into said path.

18. In a bag handling machine, means operative in a straight line path to close the top of bags, a continuously moving unobstructed surface to move bags through said operative means in a straight line path, spacer means operative on each of said bags to delay the same from movement with and relative to said unobstructed continuously moving surface, and stop means at said operative means to stop the bags from continued movement with said surface and to release the same for immediate continued movement with said continuously moving surface.

19. In a bag handling machine as in claim 18, said operative means comprising a pair of longitudinally spaced tucker arms pivotable simultaneously into the path of the bags, means to pivot said tucker arms into said path in timed relation with the stopping operation of said stop means, said tucker arms being swingable in said pivot means, and quick operating means cooperable with said arms to swing the same in said pivot means to tuck the forward and rear ends of the bag.

20. In a bag handling machine as in claim 18, said operative means comprising a pair of folder arms each pivotable from opposite lateral sides simultaneously into the path of the bags, means to pivot said folder arms into said path in timed relation with the stopping operation of said stop means, one of said arms overlying the other of said arms to fold the tops of the bags and to form a weakened folded portion on the bag.

21. A bag handling machine comprising an operative conveyor to move bags in a path through the machine, a motor to continuously operate the conveyor, a pair of spaced cooperating drive shafts, a motor to drive said shafts, a pair of bag closing shafts on said machine on opposite sides of said path of moving bags, link means interconnecting each one of said drive shafts with a respective one of said bag closing shafts for rotation of the latter by the former, bag closing means on said closing shafts operable thereby for movement into the path of the moving bags, a stop shaft having stop means movable thereby into the path of the moving bags to stop the same at said bag closing means, link means interconnecting said stop shaft with one of said drive shafts for rotation thereby, pivotally mounted delay means normally biased into the path of said moving bags, and link means providing a lost-motion connection between said delay means and a drive shaft to move said delay means out of the path of movement of the bags.

22. A bag handling means as in claim 21, means operable to vary the height of said bag closing shafts relative to said conveyor, means operable to vary the position of said stop means along the length of the conveyor, and means operable to vary the position of said delay means along the length of the conveyor.

23. In the method of closing the tops of the bags, moving the bags whose tops are to be closed in a straight path on a continuously moving surface, spacing the bags a predetermined distance from each other along said continuously moving surface by causing the same to move relative to said surface, stopping the bags from movement with said surface while the tops of the same are closed during the continued movement of the surface, and releasing the stopped bags for immediate continued movement with the surface after the same are closed.

24. In the method of closing the tops of bags, receiving the bags on a surface continuously moving in a straight path, successively spacing each bag one from the other by delaying the movement of the same relative to the continuously moving surface, stopping each bag successively, tucking and folding the bags while the same are stopped and the movement of the surface is continued and releasing the stopped bags for immediate continued movement with the surface.

25. In the method of closing the tops of bags, tucking and folding each bag in successive order and in successive operations to close the tops of the same, conveying the bags in a straight line path on a continuously moving unobstructed surface through said successive tucking and folding operations, and spacing the bags one from the other on a continuously moving surface during the movement of the surface and prior to the movement of the bags through the tucking and folding operations.

26. The method of closing the tops of bags comprising receiving the bags on a continuously moving surface, spacing each of the bags a predetermined distance from each other on the surface during the continued movement of the surface, removing the bulges from the sides of each bag and holding the same in such condition while the forward and rear ends of the tops thereof are tucked, folding the sides of the previously tucked tops to crease the same and provide a line of weakened resistance along the top of each bag to enable the same to retain their fold, stopping each bag from continued movement with the surface while they are folded, and releasing each bag for immediate continued movement with the surface after the same have had their bulges removed, their ends tucked and sides folded.

References Cited in the file of this patent

UNITED STATES PATENTS

| | | |
|---|---|---|
| 1,530,117 | Hoepner | Mar. 17, 1925 |
| 1,986,043 | Carter | Jan. 1, 1935 |
| 2,134,567 | Long et al. | Oct. 25, 1938 |
| 2,309,760 | First | Feb. 2, 1943 |
| 2,624,995 | Allen | Jan. 13, 1953 |
| 2,662,357 | Stone | Dec. 15, 1953 |